Figure 1:
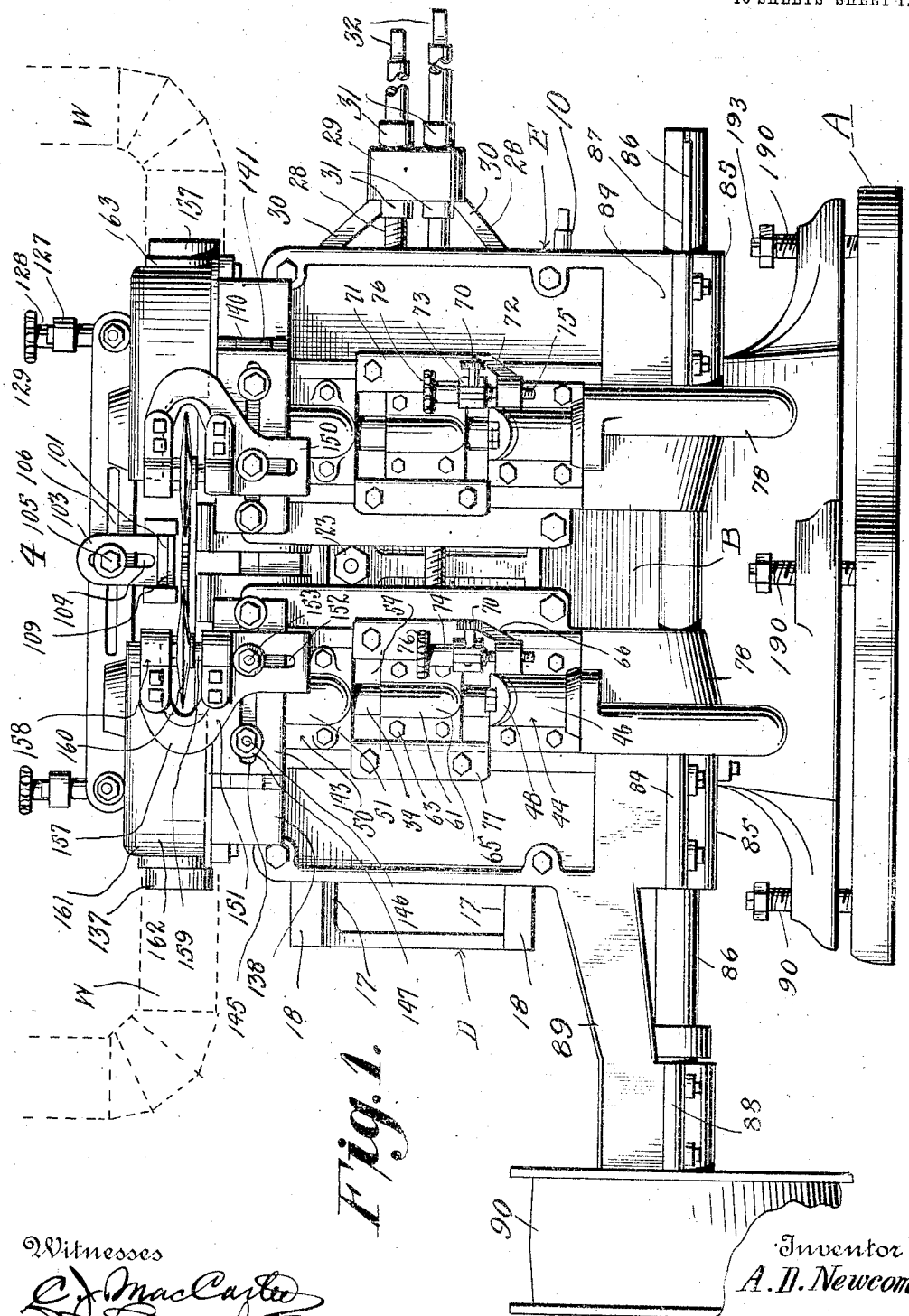

A. D. NEWCOMB.
RESAWING MACHINE.
APPLICATION FILED APR. 15, 1913.

1,110,306.

Patented Sept. 8, 1914.
10 SHEETS—SHEET 4.

Inventor
A. D. Newcomb.
By Chandlee & Chandlee
Attorney

Witnesses

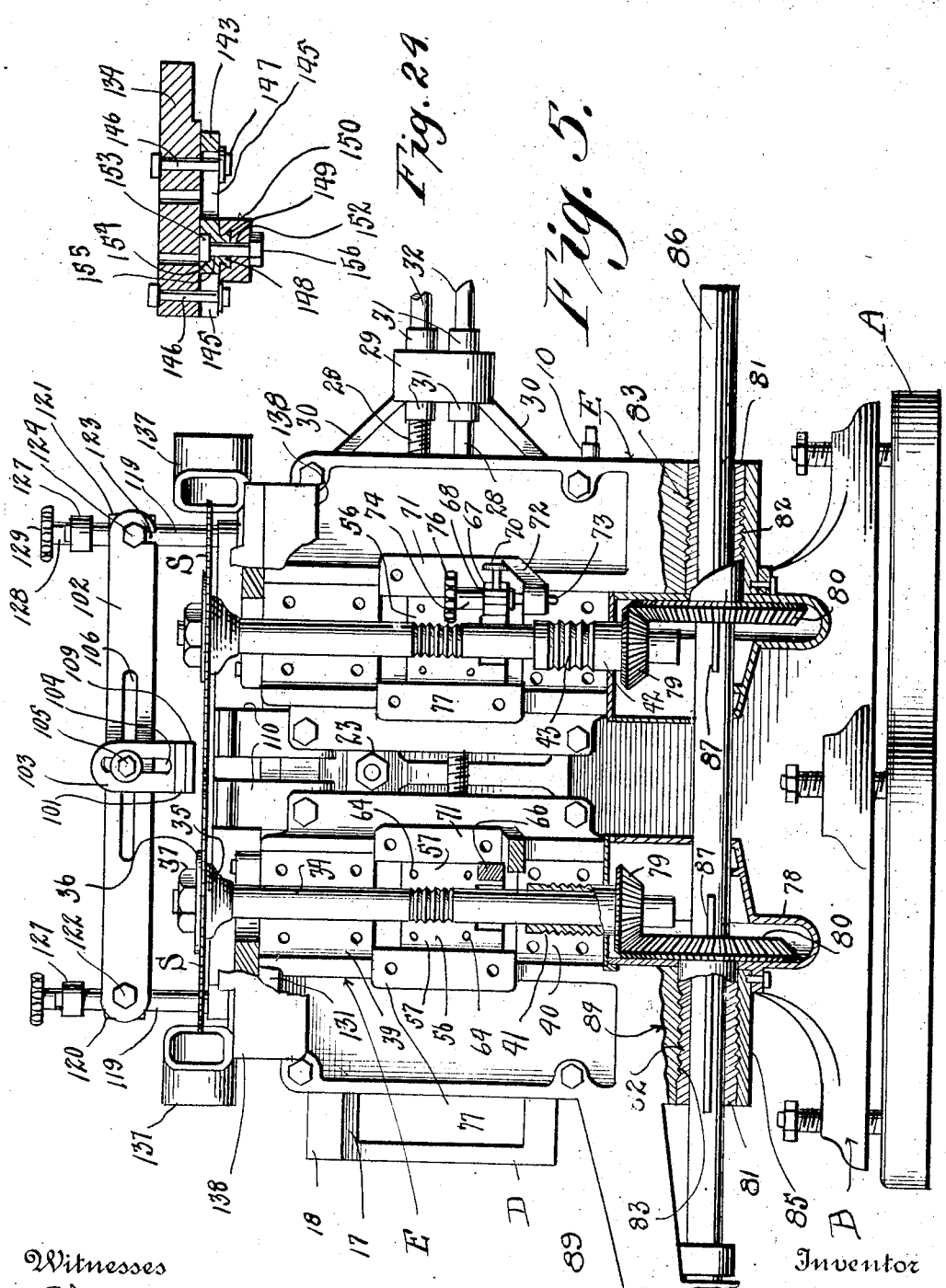

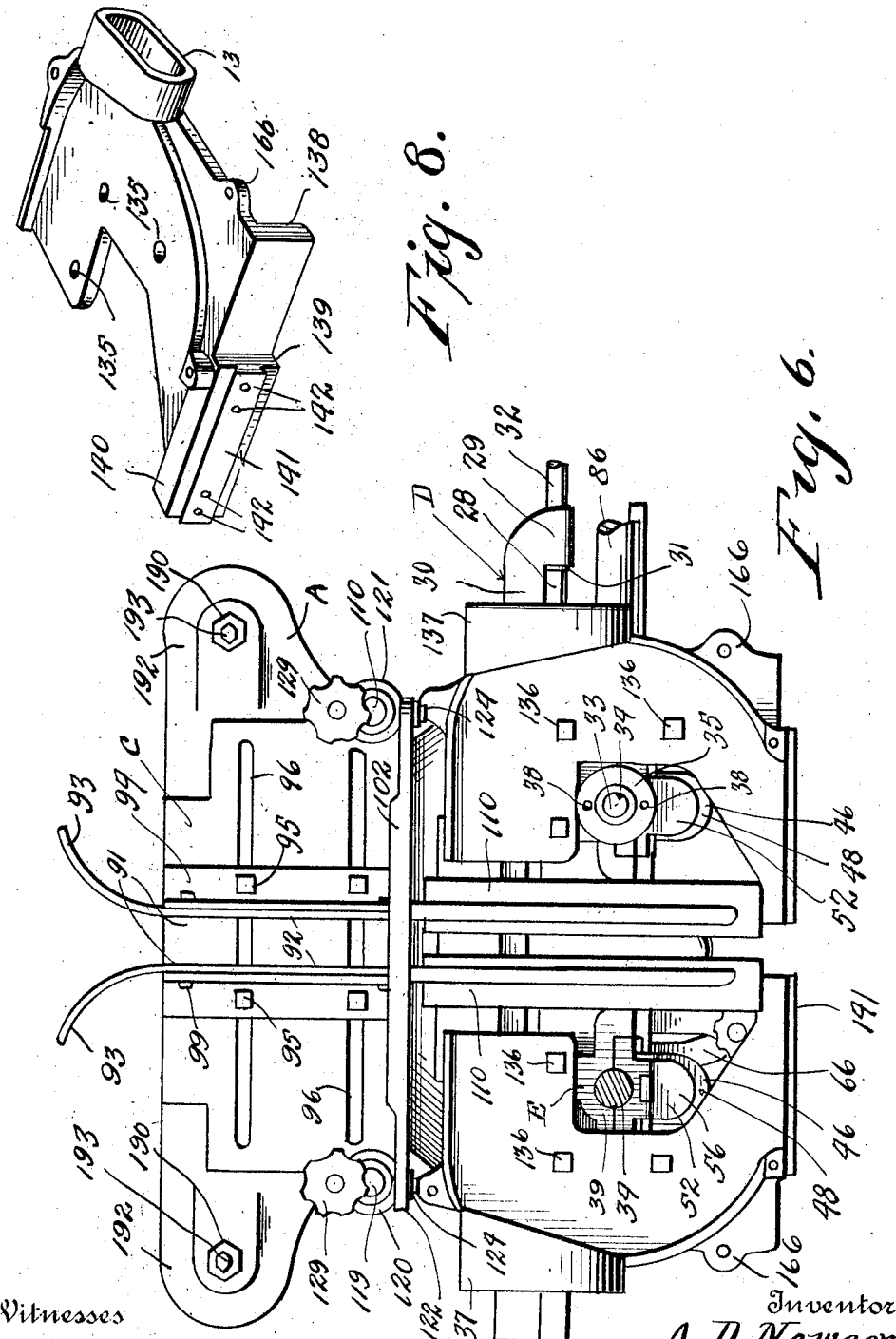

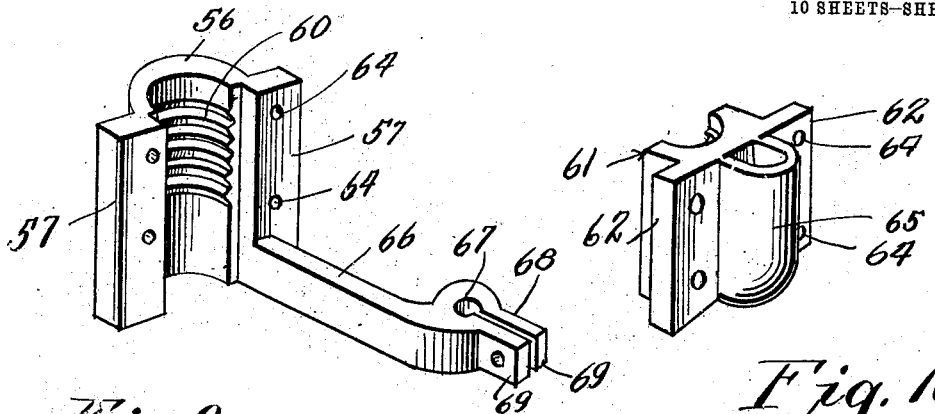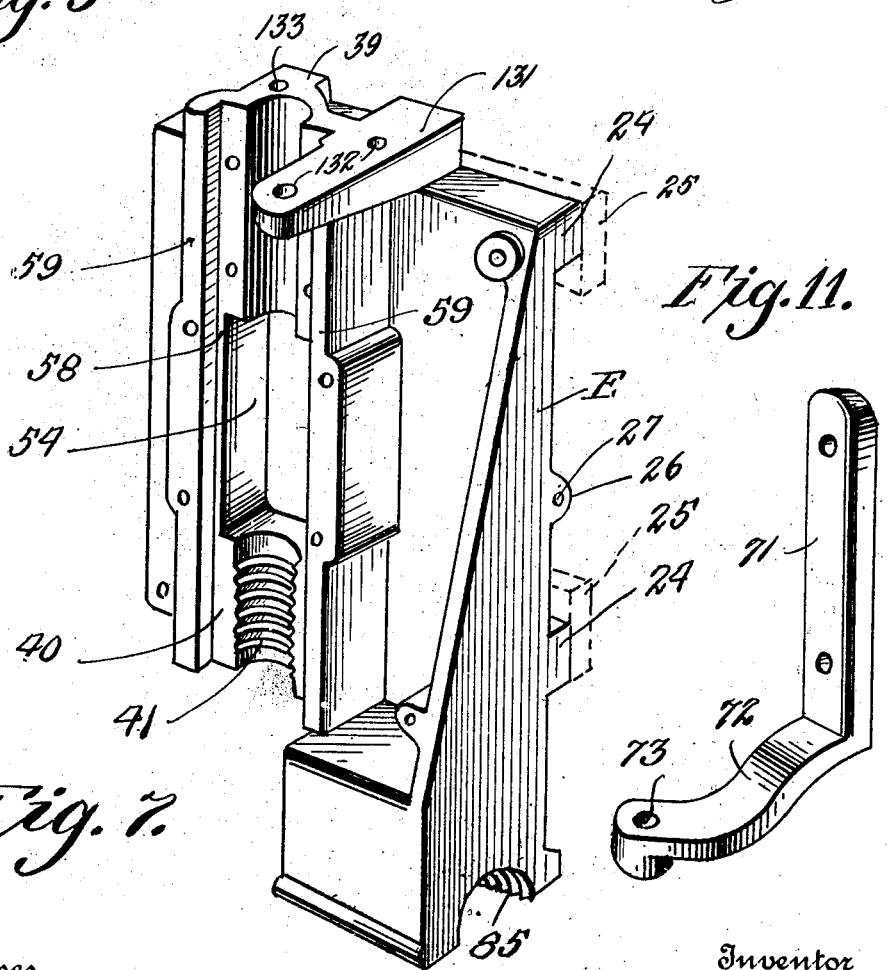

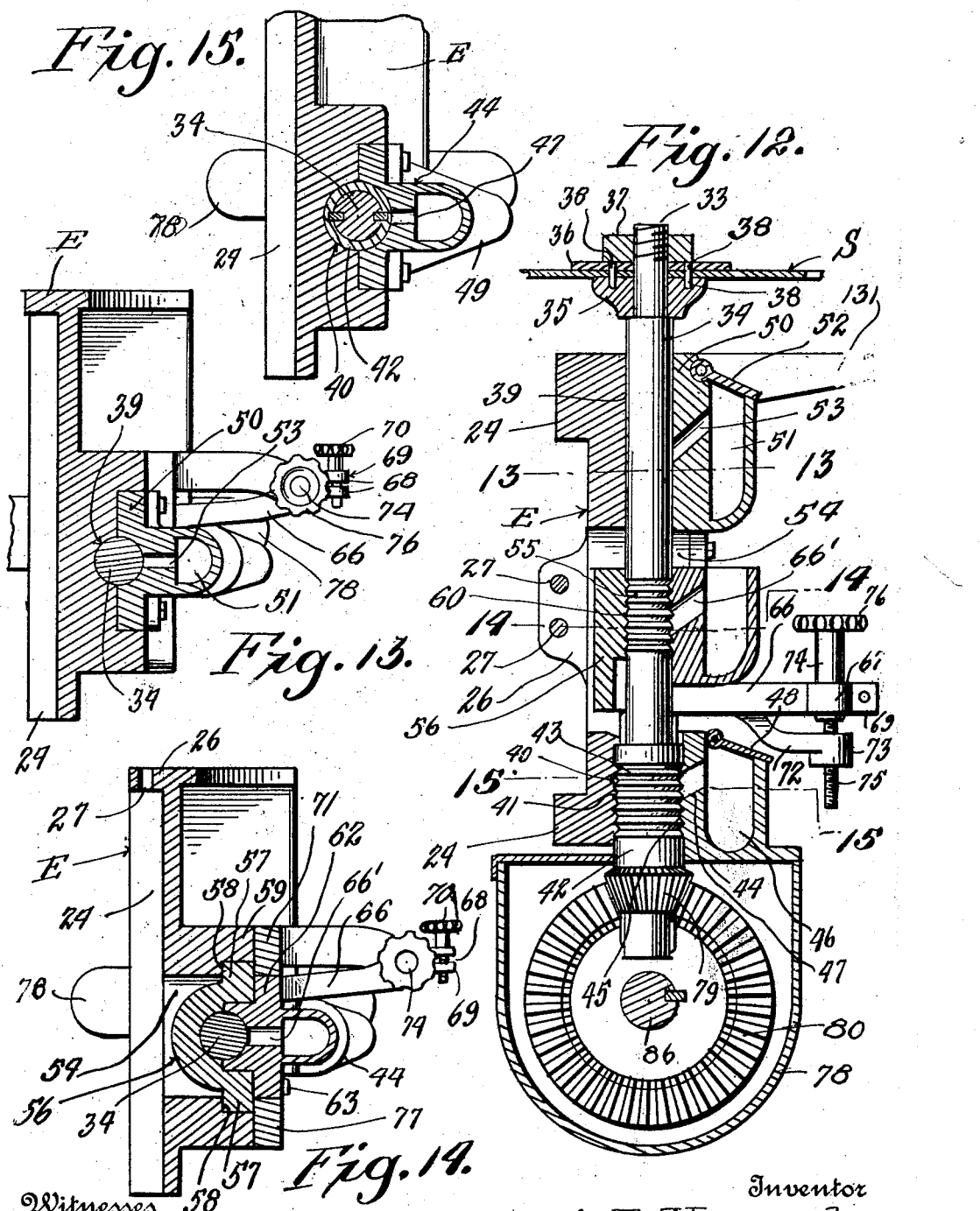

A. D. NEWCOMB.
RESAWING MACHINE.
APPLICATION FILED APR. 15, 1913.
1,110,306.
Patented Sept. 8, 1914.
10 SHEETS—SHEET 9.
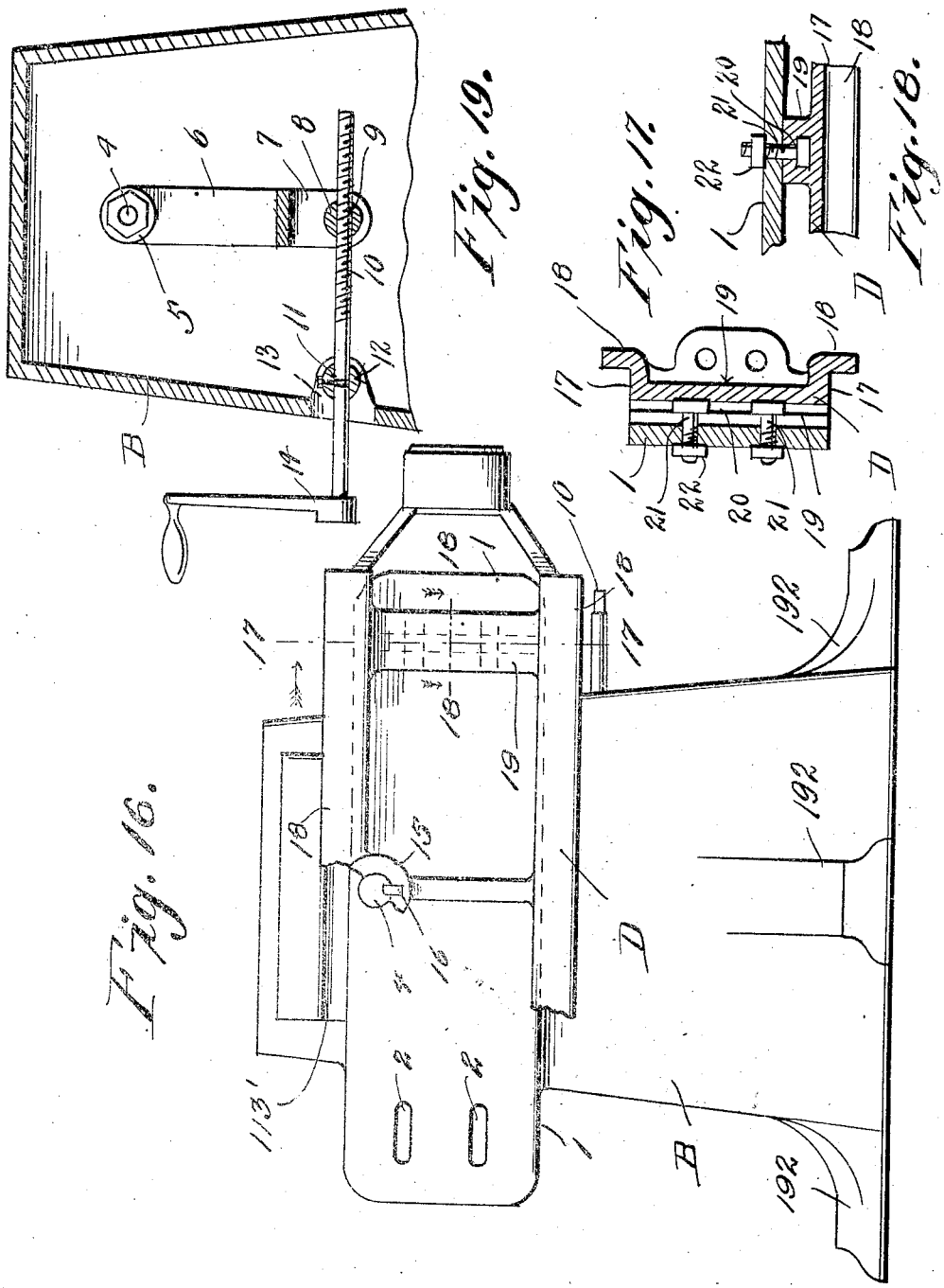

A. D. NEWCOMB.
RESAWING MACHINE.
APPLICATION FILED APR. 15, 1913.
1,110,306.
Patented Sept. 8, 1914.
10 SHEETS—SHEET 10.
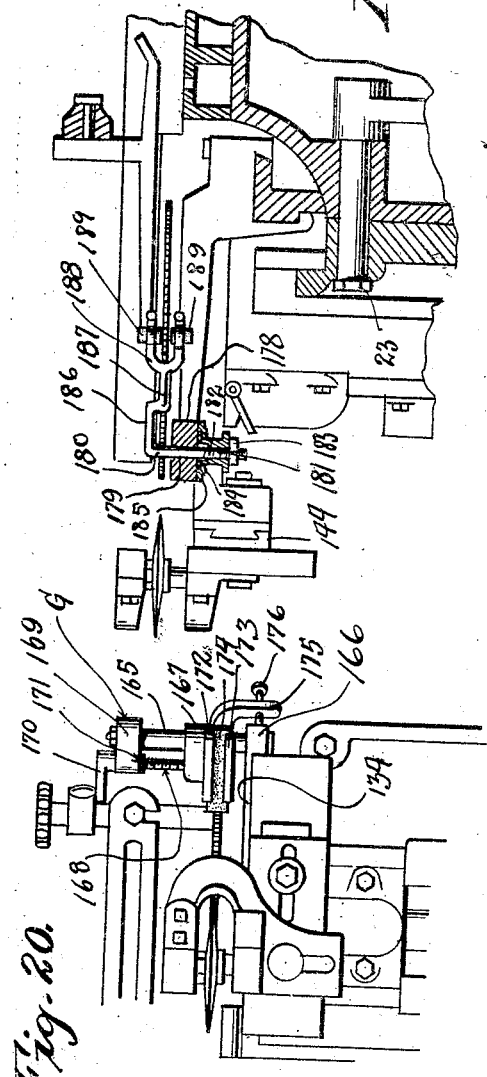
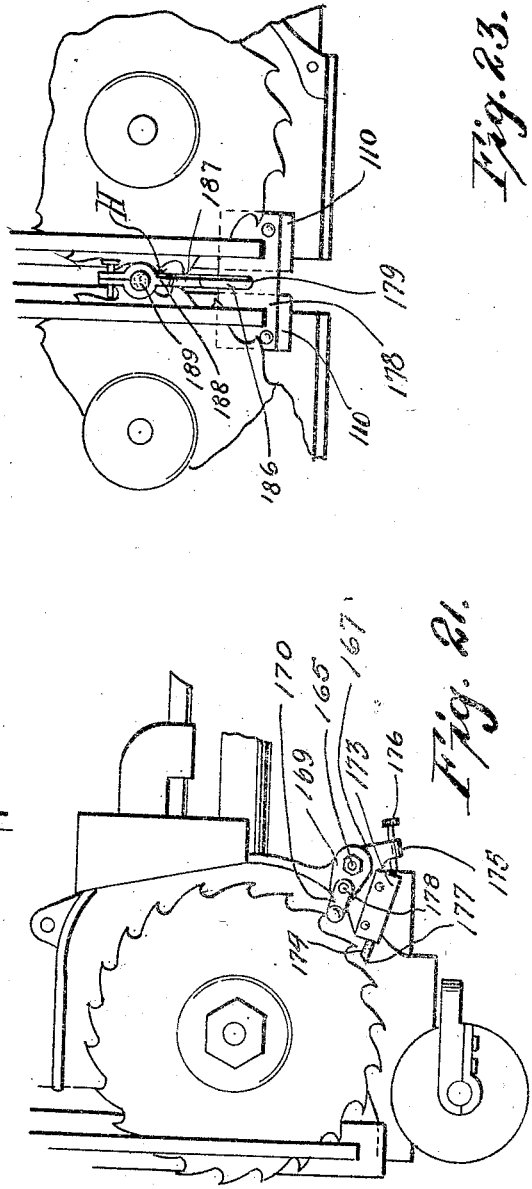
Witnesses
Inventor
A. D. Newcomb
By
Attorneys

UNITED STATES PATENT OFFICE.

ALCANZO D. NEWCOMB, OF NORFOLK, VIRGINIA, ASSIGNOR TO AUXILIARY RE-SAW CORPORATION, OF NORFOLK, VIRGINIA.

RESAWING-MACHINE 1,110,306.        Specification of Letters Patent.        Patented Sept. 8, 1914.

Application filed April 15, 1913. Serial No. 761,832.

*To all whom it may concern:*

Be it known that I, ALCANZO D. NEWCOMB, a citizen of the United States, residing at Norfolk, in the county of Norfolk, State of Virginia, have invented certain new and useful Improvements in Resawing-Machines; and I do hereby declare the following to be a full, clear, and exact description of the invention, such as will enable others skilled in the art to which it appertains, to make and use the same.

This invention relates to a re-sawing machine adapted to be attached to and employed in conjunction with any well known type of planer.

In wood working mills, at the present time the stock, after it has been dressed by the planer, is usually rehandled several times before it reaches the re-sawing machine, which is generally located in another part of the building at a considerable distance from the planer. This rehandling of the stock necessarily results in considerable labor, expense and delay. I intend to obviate all of this by so constructing my re-sawing machine that it may be arranged at and auxiliary to the planer itself, so that the stock as it passes through the latter is fed directly to the re-sawing machine, thus saving the expense incident to the employment of a number of operators in handling and feeding such stock. I also contemplate so constructing my re-sawing machine that the latter may be assembled or installed for re-sawing, while the planer is running upon other work, and when required for use may be started without delay. When the re-sawing operation has been completed, my machine may be so adjusted as not to obstruct or interfere with the operation of the planer working upon other stock.

A further object of my invention is the provision of a machine having a plurality of rotary saws, which may be adjusted at an inclination to cut bevel stock without being thrown out of alinement, and furthermore, each saw may be adjusted individually, vertically and laterally while the machine is running.

I also aim to provide a machine having a plurality of circular saws, which are so mounted and adjusted relative to each other that the teeth interlap, or describe intersecting circles so that the resulting kerf cut in the stock will be relatively narrow and perfect, that is, will be free from the formation of ridges or other irregularities.

Furthermore, I propose to provide a machine wherein the stock, as it comes from the planer, is guided positively and directly in a true path to and through the saws.

Another object of the invention is the provision of means whereby the teeth of the saws may be sharpened while the latter are running at full speed, so that a sharp cutting edge is always provided for each saw.

It is also my purpose to provide a device for trueing the saws when necessary.

Still a further object is the provision of a machine which will embody in its construction the desired features of simplicity, efficiency, economy and convenience, and furthermore, such machine may be installed and operated at a relatively low cost.

With the above recited objects and others of a similar nature in view, my invention consists in the construction, combination and arrangement of parts set forth in and falling within the scope of the appended claims.

Figure 2:
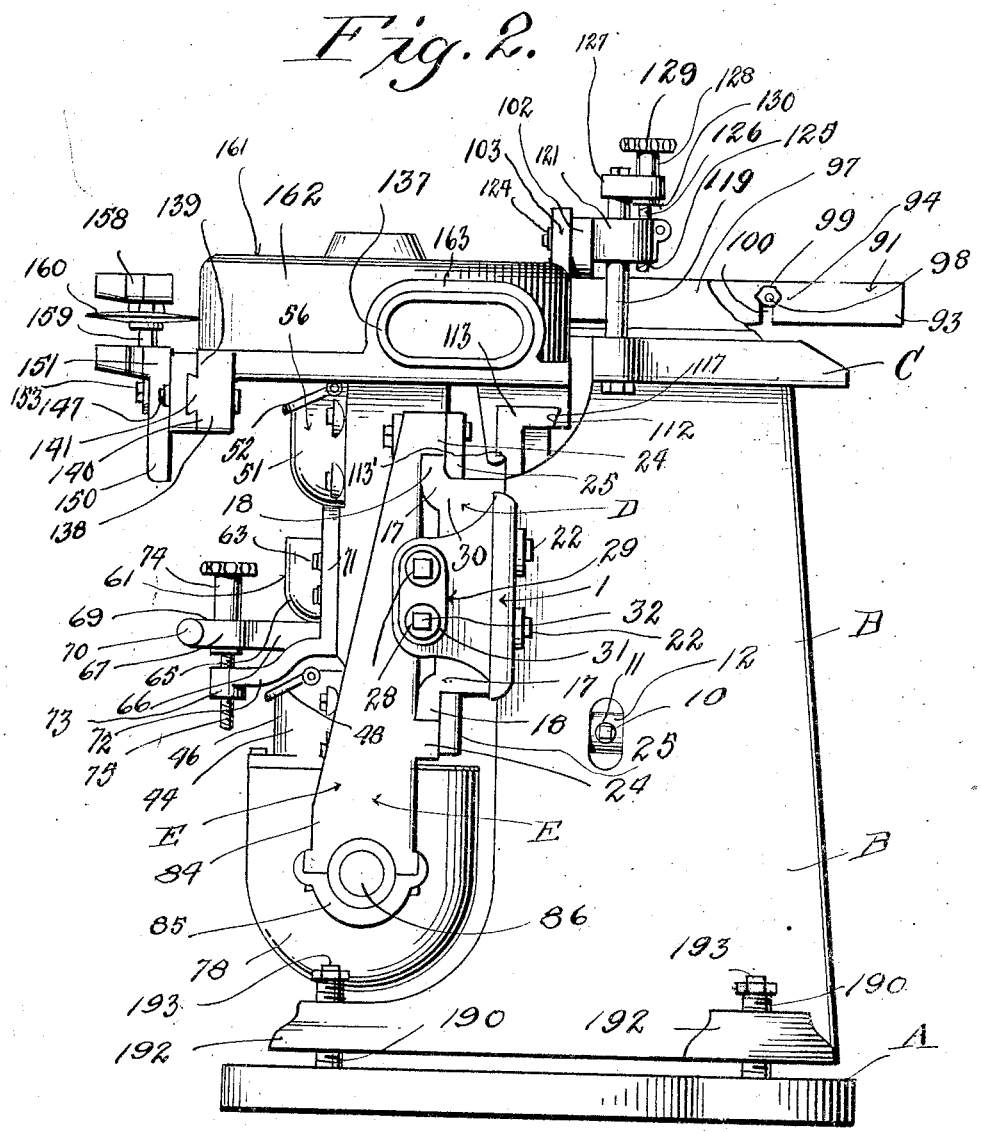
Figure 3:
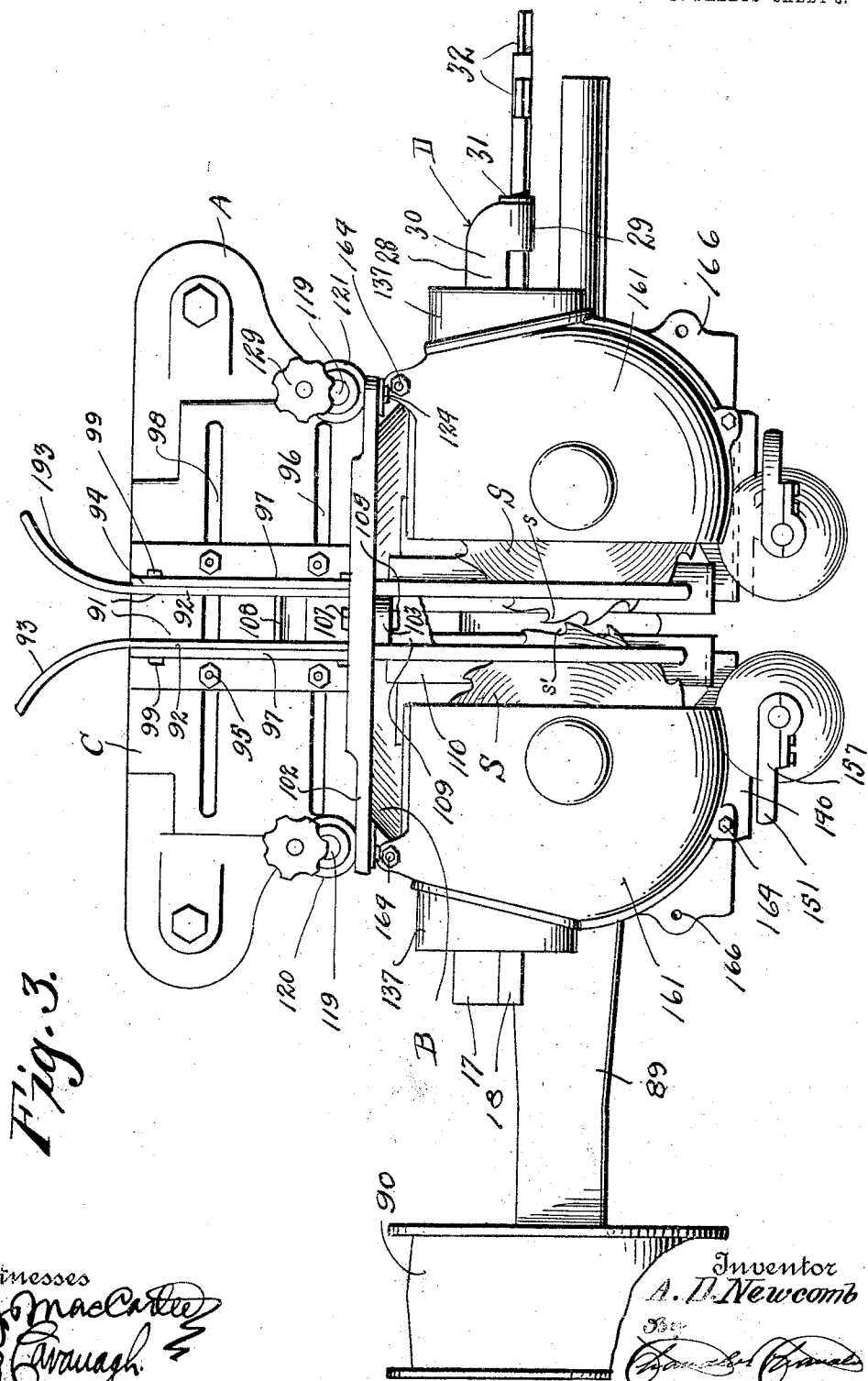
Figure 4:
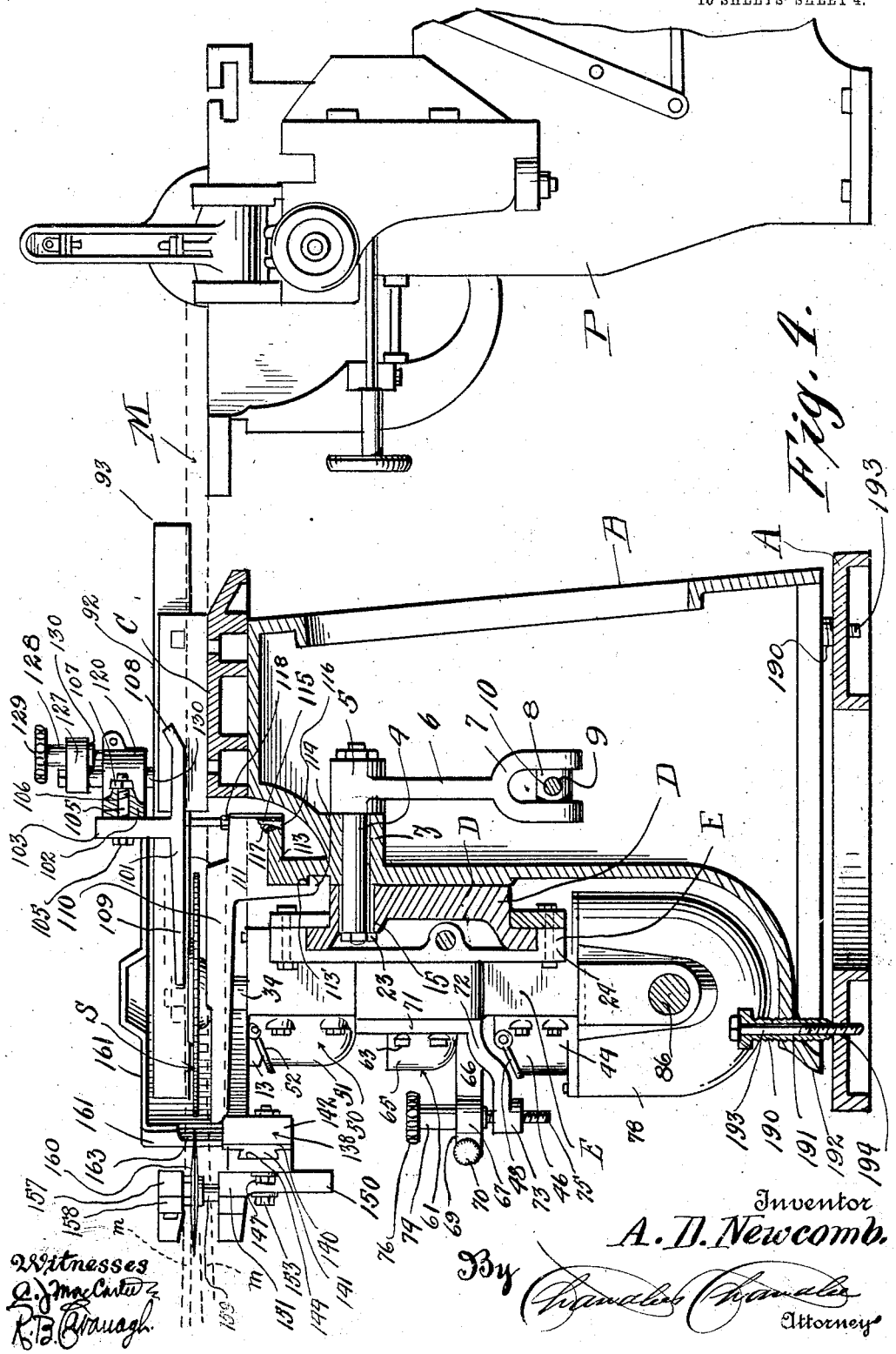

In the accompanying drawings: Figure 1 is a view in front elevation of a resawing machine embodying my invention. Fig. 2 is a view in side elevation. Fig. 3 is a top plan view. Fig. 4 is a vertical longitudinal sectional view taken through my machine and also illustrating conventionally a planer in connection therewith. Fig. 5 is a front elevation of a machine with the oil cups removed and parts broken away. Fig. 6 is a top plan view with the dust covers removed. Fig. 7 is a perspective view of the sliding frame. Fig. 8 is a detail perspective view of the plate casting which bolts to the top of the sliding frame. Fig. 9 is a detail perspective view of one-half of one of the bearing sleeves. Fig. 10 is a perspective view of the companion half of the bearing sleeve and showing the oil cup formed therewith. Fig. 11 is a perspective view of one of the angle plates. Fig. 12 is a vertical sectional view taken through the bearing boxes of the saw arbor, the latter being shown in elevation. Fig. 13 is a sectional view taken on the line 13—13 of Fig. 12. Fig. 14 is a sectional view taken on the line 14—14 of Fig. 12. Fig. 15 is a sectional view taken on the line 15—15 of Fig. 12. Fig. 16 is a front view of the main frame and showing a portion of the tilting or swinging frame carried thereby. Fig. 17 is a vertical cross-sectional view taken on the line 17—17 of Fig. 16. Fig. 18 is a horizontal sectional view taken on the line 18—18 of Fig. 16. Fig. 19 is a sectional view taken through a portion of the main casting or frame and showing the mechanism employed for swinging the central shaft carrying the tilting frame. Fig. 20 is a fragmentary front view of the machine showing the saw sharpener in position. Fig. 21 is a top plan view of the same. Fig. 22 is a sectional view through a portion of the machine showing the trueing device in operative relation thereto. Fig. 23 is a top plan view of the same. Fig. 24 is a sectional view taken on the line 24—24 of Fig. 4.

Before entering into a detailed description of my machine, I will briefly state that in its generic features of construction, it embraces a main casting, having a table which is designed to be positioned to receive the stock from the planer. Pivoted upon the main casting is an adjustable tilting frame, upon which is mounted a pair of companion sliding frames, and these latter are designed to be adjusted to and from the center vertical line of the machine. Each of these sliding frames carries a rotary circular saw and the bearings therefor, as well as the driving mechanism for the saws. The bearings or mountings of the saw arbors are so constructed that the saws may be adjusted vertically and independently. Carried by the laterally sliding frames is a pair of laterally and vertically adjustable rotary disk spreaders for separating or opening up the sections of the stock after the cut has been made. I also provide suitable adjustable appliances for properly clamping and guiding the stock in its passage through the machine.

In the use of my machine, by swinging the tilting frame and securing the same at the desired angle, the two sliding frames and the mechanism carried thereby, such as the saws and spreaders and the driving mechanism may be bodily adjusted, so as to enable the beveled stock to be cut. By shifting the sliding frames the saws may be adjusted laterally relative to each other, and by means hereinafter described in detail, the saws may also be raised and lowered independently, and the spreaders are likewise capable of vertical and lateral adjustment to correspond to the adjustment of the saws.

Referring now to the accompanying drawing in detail, and particularly to Fig. 4, the letter P indicates conventionally a planer adjacent and auxiliary to which is arranged my improved re-sawing machine. The latter embraces the bed plate A, upon which is bolted the main casting or frame B. The main table of the re-sawing machine is shown at C and is mounted upon the top of the casting B, while M designates a piece of stock passing from the planer to the re-sawing machine, this stock being sawed longitudinally into two pieces so that as it leaves the re-sawing machine it is divided as shown in dotted lines at m—m.

Referring to Fig. 16, it will be seen that the main frame B has cast integral therewith a block having the oppositely disposed laterally extending plates 1—1 which are formed with the elongated horizontally extending slots 2. A shaft bearing 3 is formed in the frame centrally of the plates and has journaled therein the shaft 4. To the inner end of this shaft is connected a collar 5 at one end of the arm 6, the opposite end of said arm terminating in a yoke 7. This yoke carries a block 8 having a threaded bore 9, through which extends the threaded section of the screw shaft 10, the unthreaded section of said shaft passing through the bore 11 of the bearing block 12 carried by the lugs 13 cast on the wall of the main frame. The extreme outer end of this shaft 10 is adapted to have applied thereto a handle 14 for rotating the shaft. As the shaft 10 is rotated the arm 6 will be rocked or swung in one direction or the other, as the case may be, and the shaft 4 will be correspondingly rocked or turned. Referring again to Fig. 16, the numeral D indicates a tilting, substantially rectangular frame formed with a bearing 15 for the reception of the outer end of the shaft 4, this frame being keyed as at 16 to the shaft 4 so that it will swing or tilt with the turning of the latter, as hereinafter described. This frame D is formed of top and bottom horizontal bars 17 which are provided with oppositely disposed flanges 18, and these bars are further connected by means of vertical cross bars 19.

Referring to Figs. 17 and 18, it will be seen that the vertical bars 19 project rearwardly of the frame so as to bear against the plate sections 1 of the main casting and each vertical bar 19 is formed with a T-slot 20 extending longitudinally thereof. To hold the rectangular tilting frame against movement relative to the main frame, I employ bolts 21, the heads of which are seated in the T-slots of the bars 19, while the shanks of the bolts extends rearward and through the slots 2 in the plates 1, the bolts being secured by the nuts 22 which may be tightened until they bear against the rear faces of the plates. It will further be noted that the T-slots of the bars 19 run crosswise of the horizontal slots 2 so that when it is desired to tilt the frame D on the main casting it is only necessary to loosen the nuts 22 and then operate the handle 14 so that the shaft 4 will be turned or rocked and consequently swing or tilt the frame D. A nut 23 is employed to hold the tilting frame on the shaft 4. This tilting frame D forms a support for the saw carrying frames E, one of which is illustrated in detail in Fig. 7. And at this time I might say that the machine is what might be termed a duplex machine, that is to say has a pair of circular saws, and as each saw and its connected and operating parts are similar in construction, a description of one side or section of the machine and its connected parts will suffice. Turning now to Fig. 7, it will be seen that this saw carrying frame E is in the nature of a casting provided at its rear face with upper and lower flanges 24 which engage with the upper and lower longitudinal flanges 18 of the tilting frame D, while at 25 I have shown longitudinal cross bars secured to the flanges 24 and adapted to hold the frame E in sliding engagement with the flanges 18 of the longitudinal bars 17 of the tilting frame. It is intended that the frames E should be shifted or moved laterally on the tilting frame D, and to accomplish this I employ the following mechanism: Formed on the back of each frame E are ears 26 having threaded bores 27. A screw shaft 28 is provided for shifting each frame E, this screw shaft extending through the threaded bores of the ears 26, while the outer end of each shaft 28 extends through an alining bore in the collar 29, which is connected with the tilting frame D, by the arms 30. Collars 31 hold each shaft 28 against longitudinal movement relative to the collar 29, so that as the shaft is rotated the frame E, to which it is applied will be shifted laterally of the main frame of the machine. The outer end of each shaft 28 is formed with a stud 32 for the reception of the crank.

Each frame E is adapted to carry one saw and its coöperating parts. In the present machine, I employ a pair of horizontally disposed saws, each of which is indicated by the letter S. Each saw, as will be seen by reference to Fig. 12, is carried by the reduced stud 33 at the upper end of the saw arbor 34, and the saw is held in place by means of the stop collar 35, the washer 36, the nut 37 and the pins 38, or if desired, any other suitable means may be employed for securing the saw to its arbor. As will be seen by reference to Fig. 7, the upper portion of the frame E is formed with a half-boxing 39 for the reception of the upper portion of the arbor 34, while the lower portion of the frame E is also formed to constitute a half-boxing 40 for the reception of the lower end of the arbor, only in this case the semi-circular, arbor seating section of the boxing is formed with a series of circumferential grooves 41. The lower end of the arbor 34 is keyed to a sleeve 42 so that it may slide therein, and the outer surface of this sleeve is formed with circumferential ribs 43 which are designed to lie in the grooves 41 of the half-boxing 40. The whole boxing for the sleeve 42 is completed by the box section 44, which is likewise semi-circular in form, and has its interior wall grooved as at 45 to match the companion grooves 41. This box section 44 is made with an oil cup 46, from which leads an oil port 47 to the sleeve 42, the cup having a pivoted closure 48. The bottom of this box section 44 forms a portion of the top of the gear casing at the bottom of the machine. The boxing for the upper portion of the arbor 34, one-half of which is formed by the section 39, as above stated, is completed by the box section 50, as is shown in Fig. 13. This box section 50 is also formed with an oil cup 51, having a pivoted cover 52 and an oil duct 53 leading through the semi-circular wall of the box section 50.

Between the upper and lower boxings, the frame E is formed with a relatively large central opening 54 which provides a sufficient space for the central portion of the arbor 34 and its appropriate bearings. As will be seen by reference to Fig. 12, the central portion of the arbor is formed with a series of circumferential ribs 55 and the boxing for this part of the arbor is shown in detail in Figs. 9 and 10. Such boxing is made of the semi-cylindrical section 56 formed with the side flanges 57 which slidably rest upon the shoulders 58 formed at the base of the vertical flanges 59 of the frame E. The semi-cylindrical portion of this boxing section 56 is provided with grooves 60 for the reception of the ribs 55 of the arbor. In Fig. 10 is shown the other portion of the central boxing which is composed of a semi-cylindrical section 61, from which extend the side flanges 62, and bolts 63 passing through the alining apertures 64 in both boxing sections 56 and 61 connect these sections to form the complete boxing. The second section of the boxing shown in Fig. 10 is also formed with an oil cup 65, from which leads an oil duct 66' to convey the lubricant to the arbor. One of the flanges 57 of the box section 56 has extending therefrom an arm 66, the outer end of which is provided with a vertical bored head 67, split at 68 and terminating in the bored lugs 69 which receive the adjusting screw 70. Bolted to the central portion of one of the flanges 59 is a plate 71 carrying an angular arm 72 which terminates in a bored head 73, and this bored head lies beneath and alines with the bored head 67 at the end of the arm 66. A hand screw 74 is rotatably mounted in the head 67 and has a threaded shank 75 which extends through and engages the threaded bore of the head 73, this hand screw being operated by the hand wheel 76. Thus it will be seen that the head 73 the arm 72 forms a bearing for the hand screw so that as the latter is rotated the central boxing, made up of the connected sections 56 and 61, will be raised or lowered and consequently the shaft arbor will be raised or lowered, and this without disturbing the sleeve 42, for as the arbor is keyed in the sleeve, it may slide therethrough without affecting the latter. To the opposite flange 59 of the frame E to which is connected the plate 71, I secure a retaining plate 77 by bolts or the like.

From the construction of the arbor and its mountings, thus far described, it will be seen that I employ substantially three boxings, which are, an upper boxing, an intermediate boxing, which also forms a means for raising and lowering the shaft, and a lower boxing which receives the sleeve 42 to which is keyed the arbor, so that while the arbor may rotate under the movement received when the sleeve is turned, as hereinafter described, the arbor may at the same time be adjusted longitudinally of the sleeve without disturbing the latter. It will be noted that each of these boxings is provided with an oil cup for a lubricant. The set screw 70, which is threaded in the lug 69 of the split head 67 is intended to be operated to tighten or loosen the bearing of the screw 73.

For the purpose of driving the saw arbors 34 and rotating the circular saws S, I employ the following construction: Located at the bottom portion of each frame D is a gear casing 78, as best shown in Fig. 5. The lower portion of the sleeve 42 extends through the top of this gear casing and the end portion of the sleeve has fast thereon a horizontal bevel pinion 79. Within the casing and meshing with this pinion is a bevel gear wheel 80, which is fast on the inner end of the sleeve 81 which projects into the casing. This sleeve is provided with a series of circumferential ribs 82 which turn in grooves 83 formed in the shaft boxing which is composed of two sections 84 and 85 bolted together. The top section 84 is cast integral or forms a part of the frame D, while the lower section 85 of the boxing is a separate semi-cylindrical piece. Thus the sleeve 81 is designed to rotate in its boxing and consequently turn the gear wheel 80. To turn the sleeve I provide the power shaft 86 to which the sleeves 81 are keyed, as at 87, this shaft extending loosely through the gear wheels 80. One end portion of the power shaft 86 is journaled in the bearing 88 at the end of the arm 89, and this end of the shaft is provided with a belt pulley 90 which may be belted with any suitable source of power. It will thus be noted that while the sleeves may be rotated in their boxings they are held against longitudinal movement relative thereto while the shaft may be adjusted longitudinally of such sleeves, this being desirable when truing up the machine while assembling. It will thus be noted that when the shaft 86 is rotated motion will be imparted to the arbors 34 and the saws S will be driven.

To properly and accurately direct the stock from the planer to the saws, I provide the vertically disposed spaced guide strips 91, the straight parallel sections 92 of which extend upward from the table C of the resaw machine, while the outwardly curved end sections 93 of these guide strips extend beyond the edge of the table and toward the planer so that they form a flared mouth for the reception of the stock coming from the planer. These guide strips 91 are adapted to be adjusted relatively to each other to accommodate pieces of stock of different widths, and to accomplish this I provide for each strip an angle bar 94, the horizontal side of which is perforated for the reception of adjusting bolts 95, which bolts project through slots 96 in the table C so that the angle bar may be shifted and adjusted along the length of the slots, as will be readily understood. The vertical side 97 of each angle bar is provided with bolts 98, the shanks of which project inward beyond the side 97 and are formed with heads 99. The guide strips 91 are provided with vertical slots 100 at the bottom edge of the strip, but terminating short of the top edge thereof, and these slots are designed to receive the bolt heads 99, and at the same time when desired, permit the strips to be lifted from the angle bars, as when it is desired to entirely remove the guide strips.

As the pieces of stock pass cross the table C between the guide strips 91, they are brought beneath the presser foot 101. This presser foot is supported from the cross bar 102 by means of its vertical arm 103, slotted at 104 for the passage of the adjusting bolt 105, which extends through the horizontal slot 106 in the bar 102. This bolt 105 is provided with the usual nut 107 so that it will be seen that the presser foot may be adjusted vertically and laterally by means of the bolt and slots and may be held in position of adjustment by tightening the nut 107. The horizontal section of the presser foot to the rear of the vertical arm 103 is provided with an upturned end 108 beneath which the piece of stock passes, so that should such piece of stock be slightly tilted upward, or have the tendency to move upward, it will be depressed and properly guided beneath the main portion of the presser foot. The forward horizontal section 109 of the presser foot extends to a point approximately in line with the center of the saws so that the pressing action of the foot is maintained until the stock is brought well within cutting position at the saws.

The main table C, as will be seen by reference to Figs. 3 and 4 terminates short of the saws, or at a point approximately in vertical line with the cross bar 102, so that some support must be provided for the stock while it is passing through the saws. I, therefore, provide a pair of stock supporting arms 110, one end of each of which is formed with a depending angular head 111, formed with angular recess 112 which receives the angular flange 113 of the main frame. The angular head of each arm is provided with a hook 114 to engage the adjacent shouldered edge 113' of the angular flange, while the numeral 115 indicates a securing bolt, the lower end of the shank of which is provided with a beveled head 116 to engage the corresponding bevel edge 117 of the angular flange 113 of the main frame. The numeral 118 indicates the nut for the bolt 115, so that as will be seen by reference to Fig. 4, each arm may be clamped to the main frame at its head portion, when desired. The main horizontally disposed section of each arm 110 projects beneath the adjacent saw, as clearly shown in Fig. 4, so that the pieces of stock will be guided and supported by these arms and by the presser foot during the time it is under the action of the rotating saws. To vertically adjust the cross bar 102, which carries the presser foot, I mount upon the main table C a pair of spaced standards 119, carrying the collars 120 and 121 respectively, and to the collar 120 is pivoted at 122 one end of the cross bar 102, the opposite or free end of the cross bar being slotted as at 123 to latch with the pin 124 carried by the collar 121. Each collar is formed with a vertically threaded bore 125 in which works the screw shank 126. The numeral 127 indicates a bearing carried by each standard 119 and in this bearing rotates a stem 128 which carries the hand wheel 129, this stem being held against longitudinal movement in this bearing by the collar 130. This stem also carries the screw shank 126, so that it will be seen that when the hand wheel 129 is rotated the collar to which the adjacent end of the cross bar 102 is connected will be raised or lowered as the case may be. Thus the bar 102 which carries the presser foot may be properly elevated and adjusted.

As the piece of stock M passes through the saws, it is cut horizontally and longitudinally into two pieces, as shown at m—m, and in order to separate or spread the two pieces of stock, so that there will be no binding action upon the saws, such as would interfere with the proper cutting I provide immediately beyond the circular saws a pair of rotary circular disks which are designed to work in the kerf or cut of the stock. It is to be understood that I employ two spreader disks, one adjacent to each saw, each of these spreaders being constructed and mounted as follows: Each frame has extending outward from its top flange 24 an integral arm 131, which is provided with bolt holes 132 and is flush with the top wall of the adjacent bearing box section 39 of the frame, which section 39 has a bolt hole 133. In Fig. 8 I show a plate 134 having bolt holes 135 which are designed to register with the bolt holes 132 and 133, when the plate is placed on top of the frame section E. This plate 134 is then fastened in place on the frame E by means of suitable bolts 136. Each plate 134 is formed at one side with a tubular collar 137 which is designed to be connected at one end to a dust or waste conduit W and which leads to any suitable device, such as a blower fan for drawing saw dust and cuttings from the machine to a suitable point of discharge. As this fan or other arrangement forms no part of the invention, it need not be shown or described. The front edge of the plate 134 is flanged as at 138, and this flange is shouldered as at 139 to form the ledge 140 which is provided with a dove-tailed bead 141, having bolt holes 142 therein.

Referring to Figs. 4 and 24, the numeral 143 indicates a plate having the back face thereof formed with a dove-tailed groove 144 for the reception of the dove-tailed bead 141. This plate 143 is provided with a pair of horizontally disposed elongated slots 145 through which the bolts 146 pass for securing the plate 143 to the ledge 140. The bolts are provided with nuts 147 which may be loosened to adjust the plate 143 longitudinally of the ledge 140 and then tightened to hold the plate in position, as will be readily understood. The front of this plate 143 is formed with a vertical dove-tailed flange 148 adapted to seat in the correspondingly dove-tailed groove 149 in the adjacent face of the shank plate 150 of the spreader bracket 151. The shank plate 150 is vertically slotted as at 152, and 153 indicates a bolt, the head of which is seated in a recess 154 in the plate 143, the shank of this bolt 153 passing through the bore 155 in the plate 153 and through the alining slot 152 in the shank plate, the bolt being locked by a nut 156. By this means the bracket 151 may be adjusted vertically relative to the plate 143 and the plate 143, itself, is adjustable laterally toward and from the center of the machine. The upper portion of each spreader bracket 151 is formed with a yoke 157, carrying the bearings 158 in which is rotatably mounted the spindle 159 of the spreader disk 160, and by reference to Figs. 1 and 4 of the drawings it will be noted that these circular, rotating spreader disks are to be adjusted to lie in substantially the same horizontal plane or in line with the circular saws so that as the stock passes the saws these spreader disks working in the kerf, or cut tend to separate the two pieces of the stock so that the latter will not bind or pinch on the rotating saws and interfere with the operation of the latter. It will further be seen that these spreaders may be adjusted vertically and laterally to correspond to the adjustment of the saws, and will be moved bodily when the tilting frame is swung on the main casting, as before described, so that the proper alinement of spreaders relative to the saws will be maintained in the cutting of the bevel stock.

Referring to Figs. 1, 2 and 3, it will be seen that each saw is partially incased by a cover 161, the vertical wall 162 of which is cut away as at 163 to permit the dust tube 137 to extend therethrough. This cover is bolted to the machine as at 164, and it is seen that it forms a dust chamber from which the saw dust is drawn through the tube 137, so that the saws may be kept comparatively clear of waste.

Referring especially to Figs. 3 and 5 of the drawings, it will be seen that the two circular saws are so arranged that they describe intersecting circles in their rotation, that is the teeth s of one saw in rotation will pass through the kerf s' of the opposite saw, but without, of course touching or contacting. By so arranging the saws the cutting edges overlap, with the result that a clean kerf is made through the piece of stock and is free from ridges or other irregularities. For the purpose of sharpening the circular saws while running, I make use of the device shown in Figs. 20 and 21 of the drawings, it being, of course, understood that I use one of these sharpening devices for each saw. This device which is indicated as an entirety by the lettter G, comprises a standard 165, which is mounted on the ear 166 of the plate 134. This standard is provided with a sliding block 167 through which passes the adjusting screw shank 168, which also extends at its upper end through the collar 169 carried by the standard 165. A handle 170 is provided for rotating the shaft 168 and the latter is held against vertical movement by means of the nut 171. Thus by the rotation of the crank handle 170 the block 167 will be fed up and down the sleeve. This block carries a holder 172, having an open face 173, through which is exposed a piece of emery stone 174, or other suitable sharpening material. The holder may be of any suitable construction and is preferably so formed that the emery may readily be inserted and removed. The block 167 carries an arm 175 through which extends the shank of the set screw 176, the end of the shank being designed to bear against the adjacent wall of the machine when the sharpener is in operative position, as shown in Figs. 20 and 21. As the collar 169 and the block 167 may turn on the standard 165, the sharpening device may be readily swung out of the way of the saws after the latter have been sharpened sufficiently. The sharpening edge 177 of the emery is properly beveled and adjusted relative to the saw teeth so that as will be seen by reference to Fig. 21 the teeth of the saws, as the latter rotate, are lightly touched or tipped by the beveled edge of the emery, and thus are kept constantly sharpened. It may be necessary at intervals in the operation to true up the circular saws, as the teeth are liable to be slightly bent or sprung out of alinement under constant work, and to speedily and accurately accomplish such truing, I provide the attachment which is indicated as an entirety by the letter H. In this attachment the numeral 178 indicates a block which is designed to be attached to and extend between the ends of the arm section 110, and this block it is to be understood, may be slipped on and off the ends of the arms. The block is bored vertically as at 179 and through this bore extends the vertical stem 180, which is threaded at its free end at 181 for the reception of the adjusting thumb nut 182 and the locking nut 183. This adjusting nut 182 is flanged at 184 and is rotatably mounted relative to the block by the ring 185. The upper end of the stem 180 has formed integral therewith a horizontal arm 186 offset as at 187 and carrying at its outer end a yoke 188, each arm of which carries a small block 189, these blocks being thus held spaced apart, and may be properly adjusted to the arms of the yoke, so that while the top block bears against the top surfaces of the saws at the points where the paths of the saws intersect the bottom block 189 will bear against the bottom faces of the saws. Thus as the saw teeth are carried past these blocks they tip against or contact with the latter and are forced to their true positions. It is to be understood that these blocks 189 are used merely for the purpose of truing or side dressing the saws when preparing for the sawing operation, and are removed when such sawing operation is in progress.

In order that the main casting or frame may be capable of adjustment relative to the bed plate in assembling the machine, so that it may be brought into proper alinement with the planer, I use tubular adjusting bolts 190 threaded through the bores 191 in the lugs 192 at the base of the main casting, the lower end of the bolt bearing against the bed plate, as shown in Fig. 4. The numeral 193 indicates a locking bolt, the shank of which extends through the bore of the tubular bolt and the lower end of such shank is threaded as at 194 to screw into the bed plate.

From the above description, taken in connection with the accompanying drawings, the construction and operation of my improved re-sawing machine will be readily apparent to those skilled in the art, and while I have herein shown and described one particular embodiment of my invention by way of illustration, I wish it to be understood that I do not confine myself to all the precise details of construction herein set forth, as modification and variation may be made without departing from the spirit of the invention or exceeding the scope of the appended claims.

What I claim is:

1. The combination with a main frame, of a pair of vertically, laterally and angularly adjustable saws rotating in opposite directions in substantially the same plane and describing intersecting cutting paths, and mechanism for driving the saws.

2. The combination with a support, of oppositely rotating interlapping saws describing cutting paths in substantially the same plane, and means for driving the saws.

3. The combination with a main frame, of a tilting frame carried thereby, a pair of sliding frames mounted on the tilting frame, a screw shaft connected with each sliding frame for sliding the latter on the tilting frame, a vertically disposed saw arbor carried by each sliding frame, a rotary saw carried by each saw arbor, means for longitudinally adjusting the saw arbors, and means for driving the saw arbors to cause the saws to rotate in opposite directions in substantially the same plane and describe intersecting cutting paths.

4. The combination with a support, of a pair of oppositely rotating saws geared together and having interlapping teeth describing intersecting cutting paths in substantially the same plane, and means for simultaneously tilting both the saws while maintaining their operative relation.

In testimony whereof, I affix my signature, in presence of two witnesses.

ALCANZO D. NEWCOMB.

Witnesses:
M. T. FRIARY,
JNO. H. TRANT, Jr.